June 2, 1931.  J. L. RUPP  1,808,147

STORAGE BATTERY SPACER

Filed Feb. 23, 1928

INVENTOR:
J. L. Rupp
by A. R. Vencill
His Attorney

Patented June 2, 1931

1,808,147

UNITED STATES PATENT OFFICE

JOHN L. RUPP, OF WILKINSBURG, PENNSYLVANIA, ASSIGNOR, BY MESNE ASSIGNMENTS, TO WUBCO BATTERY CORPORATION, OF NIAGARA FALLS, NEW YORK, A CORPORATION OF NEW YORK

STORAGE BATTERY SPACER

Application filed February 23, 1928. Serial No. 256,074.

My invention relates to storage batteries, and particularly to batteries of the type comprising positive and negative plates located in parallel spaced relation in a suitable electrolyte. More especially, my present invention relates to spacers suitable for insertion between adjacent plates in batteries of the type described.

I will describe one form of storage battery spacer embodying my invention and will then point out the novel features thereof in the claim.

Figure 1:
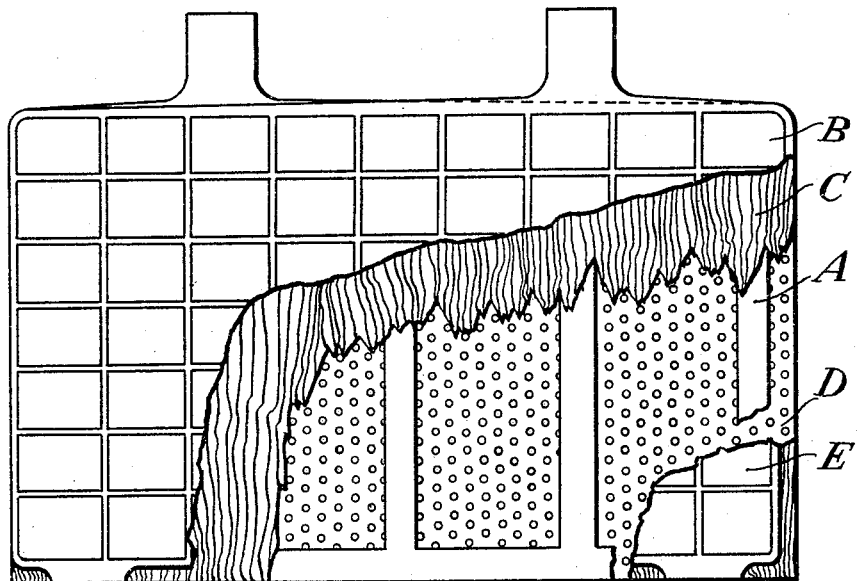
Figure 2:
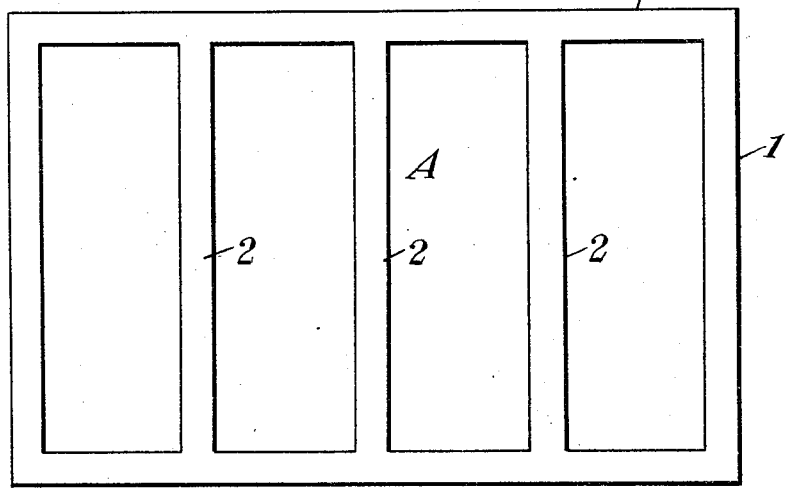
Figure 3:
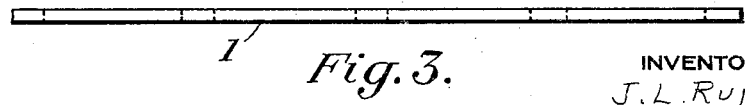

In the accompanying drawings, Fig. 1 is a view showing a portion of a storage battery embodying my invention with certain of the parts broken away to illustrate the construction. Figs. 2 and 3 are front and top views respectively of the spacer A shown in Fig. 1 and also embodying my invention.

Similar reference characters refer to similar parts in all three views.

Referring first to Fig. 1, the reference character E designates a positive plate and the reference character B and adjacent negative plate of a storage battery. Located between the plates E and B is a separator C of porous insulating material such as wood lying flat against the negative plate B. A sheet D of insulating material such as hard rubber or celluloid, perforated to allow free circulation of the electrolyte may be placed against the positive plate E to prevent dislodgment of the active material from the plate.

Interposed between the separator C and the sheet D is a spacer A. As best seen in Figs. 2 and 3, the spacer A comprises a flat smooth rectangular frame 1 having a plurality of spaced vertical ribs 2. The spacer A may be constructed of celluloid, hard rubber, or any other suitable acid resisting insulating material possessing the desired mechanical strength. This spacer is constructed with proper thickness to secure the desired distance between adjacent plates.

In storage batteries embodying my invention, the separators C may be flat sheets of wood which are thinner than the grooved wood separators now commonly in use, and the sheets D may be standard hard rubber sheets of low cost having any desired pattern of perforation. Furthermore, the same types of separators and perforated sheets may be used in a number of different types of batteries, different spacing of plates being obtained by the use of spacers A of different thicknesses. This feature greatly simplifies the stocking of parts, and since the spacers are cheaper than the usual grooved wood separators, my invention permits a material saving in the cost of manufacturing batteries.

While I have shown the spacer A used in combination with a separator C and a sheet D, it may, in some instances, be desirable to omit either the separator C or the sheet D. When the separator C is omitted, the spacer A will be made thick enough to hold the sheet D tightly against one of the plates, preferably the positive; and when sheet D is omitted the spacer A will be made thick enough to hold the separator C against the negative plate B.

The term "perforated" as used in the claim is intended to define a member having a great number of small holes through which battery electrolyte may diffuse readily but which are too small to permit of the passage therethrough of solid matter, as sediment from the plates, as distinguished from the term "apertured" which is intended to define a member having openings of such magnitude as to permit of the passage therethrough of a sediment or any other solid material which may be present in the battery.

Although I have herein shown and described only one form of storage battery spacer embodying my invention, it is understood that various changes and modifications may be made therein within the scope of the appended claim without departing from the spirit and scope of my invention.

Having thus described my invention, what I claim is:

In combination, positive and negative storage battery plates, a spacer comprising a flat apertured non-conducting member interposed between said plates, a flat perforated non-conducting sheet between said spacer and the positive plate, and a porous separator between said spacer and the negative plate.

In testimony whereof I affix my signature.

JOHN L. RUPP.